United States Patent [19]

Loftus et al.

[11] Patent Number: 4,885,796
[45] Date of Patent: Dec. 5, 1989

[54] COMMUNICATION APPARATUS FOR USE IN HAZARDOUS ENVIRONMENTS

[76] Inventors: Daniel L. Loftus, 771 Washington Ave., Bourbannais, Ill. 60914; David L. Shelley, 27 Duncan Dr., Bourbannais, Ill. 60914

[21] Appl. No.: 725,328
[22] Filed: Apr. 19, 1985
[51] Int. Cl.⁴ .......................... H04B 7/15; H04B 1/38
[52] U.S. Cl. ........................................ 455/11; 455/89; 455/100; 455/351; 381/169; 381/187
[58] Field of Search ................... 455/7, 11, 88, 79, 89, 455/95, 100

[56] References Cited

U.S. PATENT DOCUMENTS

| | | |
|---|---|---|
| 2,285,083 | 6/1942 | Cover, Sr. . |
| 3,218,607 | 11/1965 | Brock et al. . |
| 3,471,642 | 10/1969 | Beguin . |
| 3,559,209 | 2/1971 | Vail .......................................... 2/2.1 |
| 3,588,359 | 6/1971 | Cribb . |
| 3,718,862 | 2/1973 | Norris . |
| 3,845,389 | 10/1974 | Phillips et al. . |
| 3,908,168 | 9/1975 | McMahon . |
| 4,119,800 | 10/1978 | Girardi ................................. 455/79 |
| 4,152,553 | 5/1979 | White .............................. 179/156 R |
| 4,334,315 | 6/1982 | Ono et al. ............................. 455/11 |
| 4,357,711 | 11/1982 | Drefko et al. ......................... 455/89 |
| 4,412,106 | 10/1983 | Pavel .............................. 179/156 R |
| 4,491,699 | 1/1985 | Walker ................................. 455/89 |
| 4,524,461 | 6/1985 | Kostanty .............................. 455/88 |

Primary Examiner—Jin F. Ng
Attorney, Agent, or Firm—Fitch, Even, Tabin & Flannery

[57] ABSTRACT

Included in the communication apparatus are a face mask covering the eyes, the nose, and mouth of the user and which has a frame holding a transparent viewing shield with a peripheral resilient seal on the frame bearing against the user's face. A relatively low power transmitter is positioned inside the mask adjacent to the air inlet for transmitting a short range signal carrying a communication from the user. A relatively high powered transceiver is carried on the user's person. The communication apparatus also includes a receiver also carried on the user's person tuned to receive the signal of the low powered transmitter and providing an audio output. A voice actuated switch is responsive to the output of the receiver to switch the transceiver from its receiving mode to its transmitting mode. A cable interconnects the voice actuated switch and the transceiver to switch the transceiver between its modes and to supply the output of the receiver as the audio input to the transceiver, so that the user is enabled to communicate with remote receivers tuned to the frequency of the transceiver without comprising the integrity of the face mask shield or interrupting the seal about the periphery of the face mask.

8 Claims, 2 Drawing Sheets

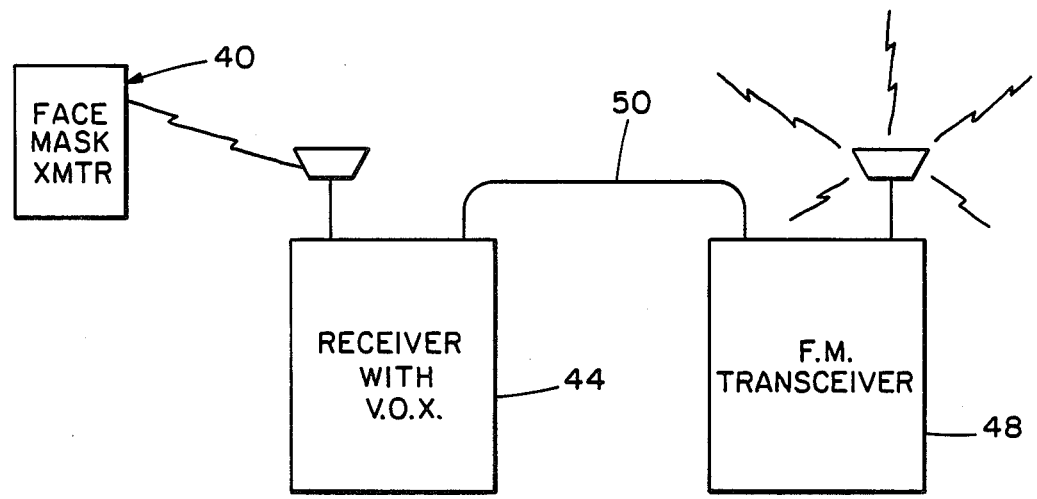
FIG.1
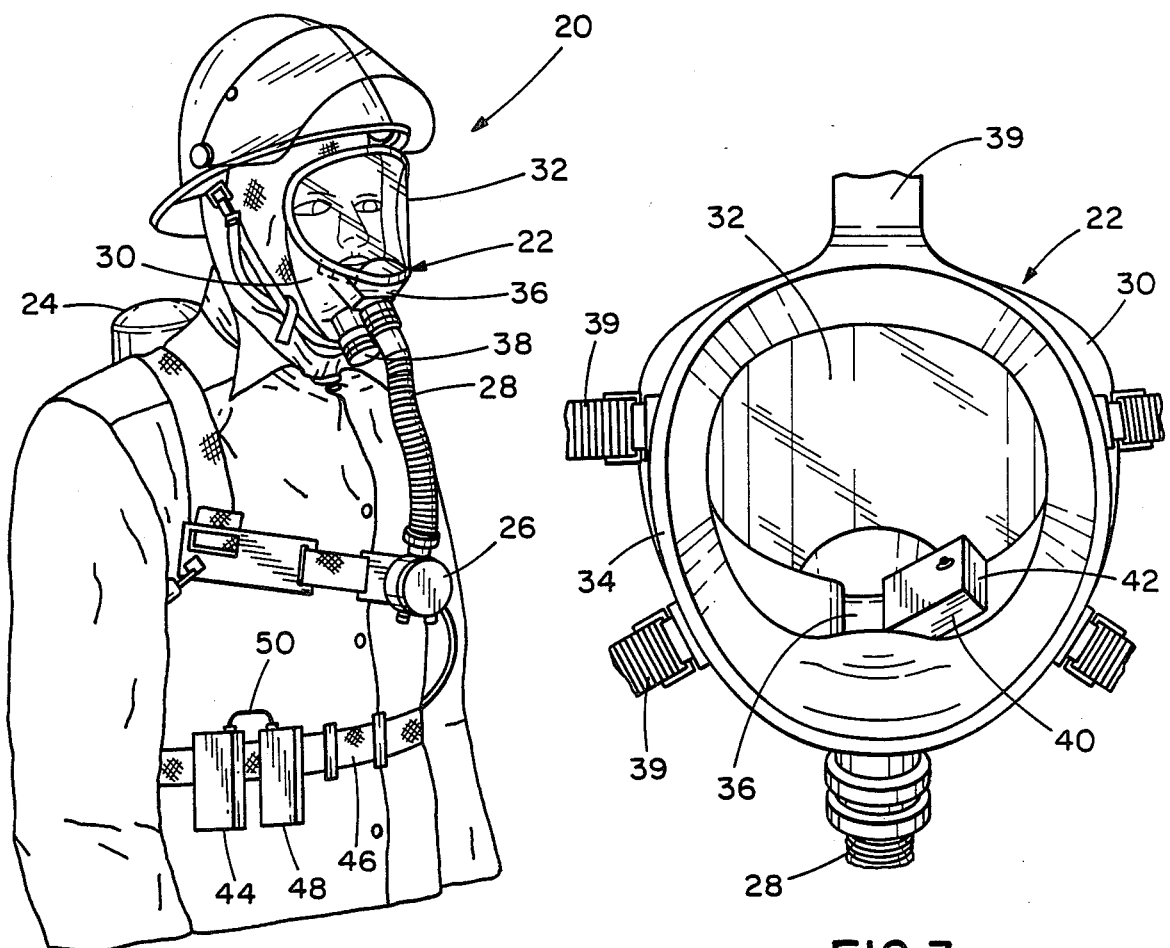
FIG.2
FIG.3

COMMUNICATION APPARATUS FOR USE IN HAZARDOUS ENVIRONMENTS

The subject invention relates to communication apparatus, and, more particularly, to communication apparatus usable in conjunction with breathing apparatus so that the user can communicate when in a hazardous environment, such as one characterized by the presence of smoke and/or noxious gases.

BACKGROUND OF THE INVENTION

Synthetic materials have come into increasingly common use for the manufacture of furniture and carpeting for the home and equipment for use in a factory environment. Unfortunately, these synthetic materials often give off noxious gases when they burn. It is becoming quite common for fire departments to employ breathing apparatus for general use in fighting smoky fires. Such breathing apparatus includes a face mask, including a transparent viewing shield held in a frame which has a seal for preventing the gases from reaching the nose and mouth of the user. The breathing apparatus also includes an air tank and a hose interconnecting the air tank with the mask. When a firefighter is in a smoky environment, where vision is often so poor that a tag line is needed for the firefighter to retrace his steps to the exit, a firefighter can become disoriented quickly. It is desirable for him to have the ability to communicate to others in the area instructions as to fighting the fire or a need for help.

The equipment the firefighter wears when in a hot, smoky environment covers virtually all his skin area. His coat includes a collar for covering the neck and a strip is provided across the throat to protect that from burning, due to the intense heat. Such fully protective clothing makes it difficult to use transmitters which might be positioned to pick up vibrations due to talking from, for example, the esophagus or a facial bone. It was also undesirable to position a microphone inside the mask because wires had to either penetrate the shield or interrupt the seal. In any case, the running of the wires resulted in an opening for the entrance of the smoke or gases to the respiratory system of the firefighter. Additionally, the running and connection of wires from the face mask represents another step in the dressing of the firefighter in his protective clothing which takes extra time before he is ready. These loose wires can become caught and disconnected when the firefighter is moving quickly about in the low visibility environment, resulting in the loss of the ability to communicate. The manufacturers of the face mask equipment are responsible for its integrity and they do not want wires or other penetrations of their mask which might be a source of failure of their system.

A radio communication system has been proposed for use by emergency vehicle operators such as motorcycle highway patrol officers. This system includes a low power helmet mounted transmitter which communicates with a receiver mounted on the motorcycle. The receiver is connected to a higher power transmitter which can communicate with other receivers. The overall range of the communication is much greater than would be possible with the transmitter alone, and the system can include a voice actuated switch so that the motorcycle operator would not have to take a hand from the handlebar to operate the system. For further information regarding the structure and operation of this system, reference may be made to U.S. Pat. No. 3,908,168.

SUMMARY OF THE INVENTION

Among the several aspects and features of the present invention may be noted the provision of improved communication apparatus for use in a hazardous environment where the user is wearing breathing apparatus including a full face mask. The communication apparatus allows the user to communicate without interruption of the transparent shield of the mask or the seal about the face by the presence of wires to prevent the entrance of smoke or noxious gas. The communication apparatus includes a low power transmitter mounted inside the face mask which is of small size, lightweight and uses a low power battery. There is no requirement in using the communication apparatus that any additional steps be required in the donning of the protective clothing and breathing apparatus. Accordingly, there is no delay in his preparing to enter the hazardous environment. The communication apparatus of the present invention is suitable for use with existing communication components, such as the standard-issue FM transceiver used by fire departments throughout the United States. The communication apparatus of the present invention is reliable in use, has long service life, and is simple and economical to manufacture. Other aspects and features of the present invention will be, in part, apparent and, in part, pointed out specifically in the following specification and accompanying claims and drawings.

Briefly, the communication apparatus of the present invention includes a face mask covering the eyes, nose and mouth of the user. The mask has a frame holding a transparent viewing shield and further includes a peripheral resilient seal on the frame bearing against the user's face to seal against the entrance of smoke and/or gas to the user's respiratory system. An air supply includes a tube connected to the mask for providing breathable air to the user through the mask. For this purpose, the mask has an air inlet opening positioned adjacent the user's mouth. A relatively low power transmitter is positioned inside the mask adjacent the air inlet for transmitting a short range signal carrying a communication from the user. A relatively high powered transceiver is carried on the user's person with the transceiver being of the type responsive to the operation of a switch to shift from a receiving mode to a transmitting mode. The transceiver transmits on a different frequency than that used by the low powered transmitter. Thus, the low powered signals on a different frequency won't interfere with the signals being transmitted by the firefighters to a command location as at a fire truck. A receiver carried on the user's person is tuned to receive the signal of the low powered transmitter and provides an audio output to the transceiver. A voice actuated switch is also carried on the user's person and is responsive to the receiver providing an output to switch the transmitter from its receiving mode to its transmitting mode. Finally, a cable interconnects the voice actuated switch and the transceiver whereby the user is enabled to communicate with remote receivers without compromising the integrity of the face mask.

BRIEF DESCRIPTION OF THE DRAWINGS

FIG. 1 is a block diagram showing electronic components of the communication apparatus of the present invention including a transmitter mounted in the face mask, a receiver with a voice actuated switch, an FM transceiver and an interconnection cable connecting the receiver and the FM transceiver;

FIG. 2 illustrates a firefighter, in full dress, wearing the communication apparatus of the present invention;

FIG. 3 illustrates the mounting of the low powered transmitter inside of the face mask;

Corresponding reference characters indicate corresponding components throughout the several views of the drawings.

DESCRIPTION OF THE PREFERRED EMBODIMENT

Figure 4:
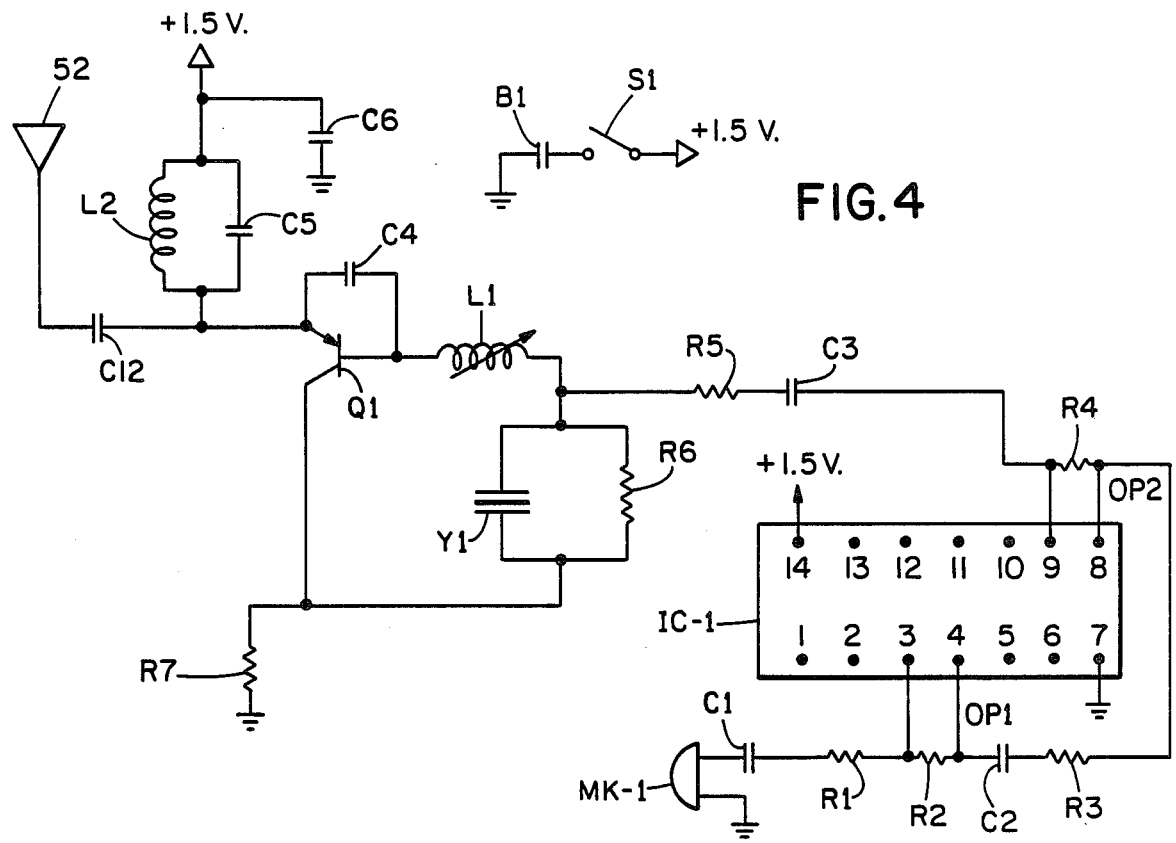
FIG. 4 is a schematic diagram of the face mask transmitter.

Referring now to the drawings, communication apparatus, incorporating breathing equipment of the present invention is generally indicated in FIG. 2 at reference numeral 20. Incorporated in the apparatus is what is known as "air-pack" breathing equipment which includes a face mask 22, and an air supply tank 24 which provides breathable air to a regulator 26 which in turn is connected to the face mask by an air supply tube 28. The face mask has a frame 30 holding a transparent viewing shield 32 with the frame having a peripheral resilient seal 34, best shown in FIG. 3, for bearing against the user's face to seal against the entrance of smoke or noxious gas to the user's respiratory system. The frame has an air inlet opening 36 adjacent the user's mouth for receiving breathable air from the tube 28. An air exhalation valve 38 is interconnected with the air inlet to allow the user to exhale. The valve 38 closes after exhalation to prevent the entrance of smoke or gas from the hazardous environment. The mask has adjustable straps 39 for tightening the mask to compress the seal against the face.

Referring to FIG. 1, the electronic components of the communication apparatus include a small, lightweight face mask transmitter 40 which is of very low power and short range. The transmitter is mounted inside the face mask, as shown in FIG. 3, adjacent the air inlet 36 and includes an enclosure 42 which falls within the envelope of a two inch cube so that the transmitter can be mounted in the face mask without interfering with the breathing or viewing of the user. The low powered transmitter 40 is preferably operated by a small, lightweight battery B1, such as one found in an electronic wristwatch. The transmitter 40, which preferably weighs less than three ounces, provides a signal which is received by a receiver 44 mounted on the user's person, such as on his belt 46. As will be set forth more fully below, the receiver incorporates a voice actuated switch for controlling the mode of a standard-issue FM transceiver 48 of the type in common use in fire departments throughout the United States. The transceiver 48 is of the kind switchable between a transmitting mode and a receiving mode depending on operation of an external switch, such as might be incorporated in a hand held microphone interconnected with the transceiver. An interface cable 50 joins the receiver and transmitter. It will be appreciated that the FM transceiver 48 is also carried on the user's person such as on the belt 46 and that the incorporation of the electronic components in the standard firefighter's equipment does not require any additional steps or the expenditure of any additional time in the firefighter's putting on the equipment. That is, there are no additional wires which need to be run such as in prior art communicators which extended to a microphone located in the face mask. The use of such extraneous wires interferes with of the firemen donning the protective clothing and also can interfere with his bodily movement after he is in his equipment. The mask 22 is extremely close fitting to the face to allow movement of the firefighter through tight places without catching the mask. For example, the maximum amount of spacing between the viewing shield 32 and the closest adjacent portion of the seal 34 is less than five inches.

Referring to FIG. 4, the electronic components used in the transmitter 40 are powered by the small one and a half volt watch battery B1 which can be connected to energize components of the transmitter 40 by means of a single pole, single throw switch S1. It has been found that battery B-1 provides power sufficient to operate the transmitter for 6–8 hours. Alternatively, the battery could be of the rechargeable type with the communication apparatus left in the firetruck with the battery connected to a charger until the communication apparatus is removed for use. The transmitter includes an integrated circuit IC-1 which is a quad-type operational amplifier chip. The chip incorporates four operational amplifiers, although only two are used in the present application. More specifically, pin 3 is the inverting input of one amplifier OP1 with pin 4 representing the output of that amplifier. Pin 8 represents the inverting input of a second operational amplifier OP2 with pin 9 being the output of that second amplifier.

The transmitter 40 includes a microphone MK-1 connected to a coupling capacitor C1 which is in turn connected to the inverting input of the first operation amplifier OP1 through a load resistant resistor R1. The first operational amplifier has a feedback resistor connected across its output and inverting input for providing a gain of 10. The output of the first operational amplifier is coupled to the load resistor R3 of the second operational amplifier OP2 through a coupling capacitor C2 with the second amplifier having a feedback resistor R4. The output of the second operational amplifier is connected to a 47.1 megacycle crystal Y1 through a coupling capacitor C3 and an isolation resistor R5. A load resistor R6 parallels the crystal and is connected to ground through a resistor R7 which biases the collector of a PNP transceiver Q1. The base of transistor Q1 is connected to the crystal through a variable inductance coil L1 to allow frequency adjustment. The emitter and base of the transistor are shunted by a feedback capacitor C4. The emitter of transistor Q1 is connected to the watch battery power source through a radio frequency choke made up of the parallel combination of a coil L2 and a capacitor C5. A bypass capacitor C6 is employed to shunt RF to ground. The emitter of transistor Q1 is connected to an antenna 52 through a coupling capacitor C12 for transmitting a signal carrying a communication from the firefighter. The antenna can take the form of a wire wrapped in several turns around the enclosure 42 for the transmitter 40. Accordingly, anytime the firefighter speaks, the transmitter 40 provides a weak audio signal. Preferably, the crystal Y1 operates at an FM frequency other than that transmitted by the transceiver 48, 47.1 megacycles being a preferred frequency for the transmitter. It will be appreciated that when a number of firefighters use the communication apparatus of the present invention, each transmitter 40 transmits at a slightly different FM frequency (47.1 MHz, 42.2 MHz . . . etc.) and each corresponding receiver 44 is tuned accordingly.

Figure 5:
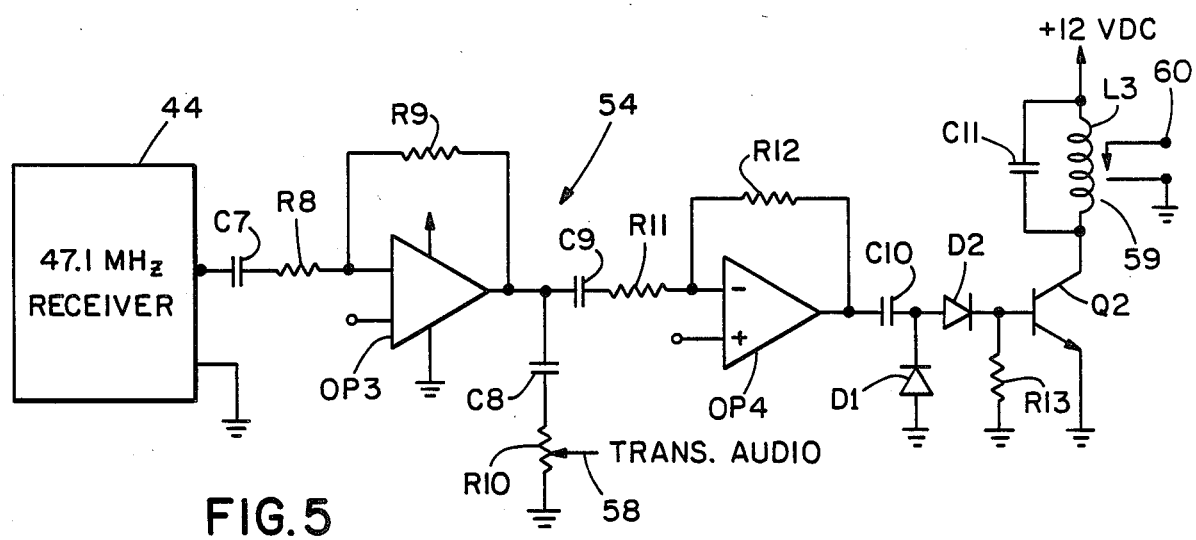
FIG. 5 is a schematic diagram of the voice actuated switching circuit used in the communication apparatus of FIG. 1.
Figure 6:
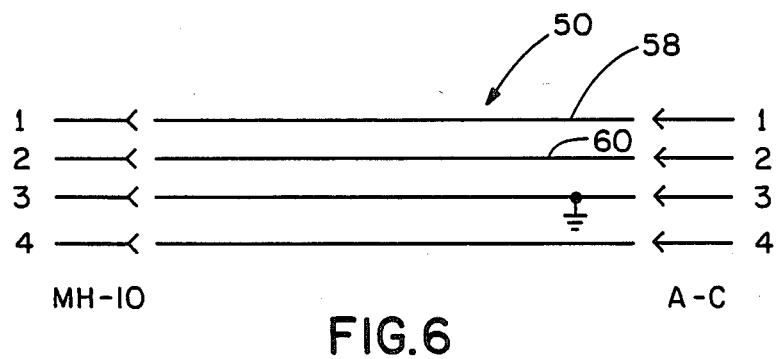
FIG. 6 shows the conductors in the cable interconnecting the voice actuated switch and the standard-issue FM transceiver.

Referring to FIG. 5, the receiver 44 and a voice actuated circuit 54, interfacing the receiver and the transceiver, are mounted inside a common enclosure 56. The receiver 44 is shown in block form, being a standard FM receiver tuned to 47.1 MHz. The audio output of the receiver 44 is coupled to a third operational amplifier OP3 in switch 54 through a coupling capacitor C7 with a load resistor R8 connected between the capacitor C7 and the inverting input of OP3. A resistor R9 is connected across the inverting input and the output OP3 to provide negative feedback. The output of OP3 is connected to ground through a coupling capacitor C8 and a variable resistor R10, the wiper of which is connected to a transceiver audio lead 58. The lead 58 is included in the interface cable 50 and provides the audio input to the transceiver 48. The output of OP3 is also connected to another operation amplifier OP4 through a coupling capacitor C9 and a load resistor R11 connected to the inverting input of OP4 with a feedback resistor R12 interconnecting the output and inverting input of OP4. The output of amplifier OP4 is connected to a rectifier formed by diodes D1 and D2, through a coupling capacitor C10. The output of the rectifier controls the operation of a NPN transistor Q2 the base of which is connected to ground through a bias resistor R13. Energization of transistor Q2 by applying a voltage to its base causes current to flow through the coil L3 of a relay having normally open contacts from a 12 V. battery which can also be used as a source of power for amplifier OB3 and OP4. That is, the contacts are biased to the open position and close in response to energization of the coil L3. One of the contacts is grounded and the other is connected to a lead 60 which is included in the interconnection cable along with lead 58. It will be appreciated that closing of the contacts of the relay 59 switches the transceiver to a transmitting mode. Thus, when the firefighter speaks into the mike MK-1, the signal provided by the transmitter 40 is received by receiver 44. The receiver and voice actuated switch provide an audio output while transistor Q2 is rendered conductive to energize coil L3 resulting in the transceiver being switched to its transmitting mode.

This convention of closing normally open contacts to switch the transceiver is chosen for a representative standard-issue FM transceiver. It will be appreciated by one of skill in the art that if a FM transceiver is used wherein the opening of contacts shifts the transceiver to the transmitting mode, it is a simple matter to change the circuitry of the voice actuated circuit 54 to accomplish this result. A capacitor C 11 is positioned across coil L3 to afford a time delay to prevent rapid opening of the relay contacts. This prevents opening of the relay contacts with each syllable or slight pause in the speech of the user.

Operation of the communication apparatus 20 is as follows: The firefighter simply dresses into his firefighting equipment as normal with the exception of switching on the transmitter 40 by closing switch S1 as he dons his face mask. Once inside the burning building or other location with a hazardous environment, he simply speaks into the microphone incorporated into the transmitter 40 which transmits a short range signal picked up by the receiver 44 held on his belt. The receiver provides the audio output and the signal to the voice actuated switching circuit 54 which functions to change the standard-issue transceiver 48 from its receiving mode to a transmitting mode. The amplified signal is transmitted by the transceiver to remote receivers with other firefighters or to vehicles or a base station. Thus the firefighter is able to issue orders or send a call for help without any interruption of his face mask viewing shield 32 or the seal 34.

Preferable values for the various electrical components included in the transmitter 40 and the voice actuated circuit 54 are as follows: Resistors R1, R3, R8 and R11 are 100 kilohms while R2, R4, R9 and R12 are 1 megohm. Resistors R5 and R6 are 470 ohms, resistor R7 is 3.3 kilohms and resistor R13 is 10 kilohms. Capacitors C1, C2, C6, C7, C8 and C9 are all 0.01 microfarads. Capacitors C3 and C10 are 4.7 microfarads while capacitors C4 and C12 are 47 picofarads, capacitor C5 is 6.8 picofarads, and capacitor C11 is 200 microfarads. Inductor L2 has a value of 10 microhenries.

In view of the above, it will be seen that the several objects of the invention are achieved and other advantageous results attained.

As various changes could be made in the above construction without departing from the scope of the invention, it is intended that all matter contained in the above description or shown in the accompanying drawings shall be interpreted as illustrative and not in a limiting sense.

What is claimed is:

1. Communication apparatus for use in a hazardous environment such as one characterized by the presence of smoke and/or noxious gas, said apparatus comprising:
    a standard-issue firefighter's face mask covering the eyes, nose and mouth of the user, said mask including a frame holding a transparent viewing shield and further including a peripheral resilient seal on said frame bearing against the face of the user to seal against the entrance of said smoke and gas to the respiratory system of the user,
    a standard-issue firefighter's helmet, said helmet being entirely separate from said face mask,
    a standard-issue firefighter's air supply including a tube connected to said mask for providing breathable air to the user through said mask, said mask further including an air inlet opening positioned adjacent to the mouth of the user,
    a relatively low power transmitter positioned entirely inside said mask adjacent said air inlet for transmitting a short range signal carrying a communication from the user, said transmitter including a microphone and an enclosure holding said microphone and other components of said transmitter,
    a relatively high powered standard-issue firefighter's transceiver carried on the person of the user, said transceiver being responsive to the operation of switch means to shift from a receiving mode to a transmitting mode, said transceiver transmitting on a different frequency than the frequency on which said low power transmitter transmits;
    a receiver carried on the person of the user tuned to receive the signal of said low power transmitter and providing an audio output;
    a voice activated switch means also carried on the person of the user and which is responsive to said receiver providing said audio output for providing a switching output to switch said transceiver from said receiving mode to said transmitting mode; and means interconnecting said switch means and said transceiver for providing said audio output and said switching output to said transceiver whereby the user is enabled to communicate with remote receivers tuned to the transmitting frequency of said transceiver without compromising the integrity of the face mask as by running wires through the viewing shield or interrupting the seal due to passage of wires between the seal and the face of the user.

2. Communication apparatus as set forth in claim 1 wherein said mask is of the type wherein said viewing shield lies closely adjacent to the face of the user, the maximum spacing between said shield and the closest portion of said seal being less than five inches.

3. Communication apparatus as set forth in claim 1 wherein said frame is resilient and said transmitter is mounted on said frame.

4. Communication apparatus as set forth in claim 1 wherein said receiver and said voice activated switch means are mounted in a common enclosure, said interconnecting means comprising an interface cable running between said enclosure and said transceiver.

5. Communication apparatus as set forth in claim 4 wherein said interface cable includes at least three conductors with one conductor being connected to said voice actuated switch means, a second conductor carrying said audio output to said transceiver, and a third conductor being connected to system ground.

6. Communication apparatus as set forth in claim 1 wherein said voice activated switch means comprises a voice activated switch and an amplifier for amplifying the output of said receiver and supplying the amplified output as an audio input to said transceiver.

7. Communication apparatus as set forth in claim 1 wherein said low power transmitter comprises a power supply including a watch battery.

8. Communication apparatus as set forth in claim 1 wherein said low power transmitter fits within the envelope of a cube two inches on a side, and weighs less than three ounces.

* * * * *